United States Patent
Cachovan et al.

(10) Patent No.: US 10,304,219 B2
(45) Date of Patent: May 28, 2019

(54) INTRA RECONSTRUCTION MOTION CORRECTION

(71) Applicant: Siemens Medical Solutions, Malvern, PA (US)

(72) Inventors: Michal Cachovan, Baiersdorf (DE); Alexander Hans Vija, Evanston, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 76 days.

(21) Appl. No.: 15/315,313

(22) PCT Filed: Jun. 12, 2015

(86) PCT No.: PCT/EP2015/063190
§ 371 (c)(1),
(2) Date: Nov. 30, 2016

(87) PCT Pub. No.: WO2015/189397
PCT Pub. Date: Dec. 17, 2015

(65) Prior Publication Data
US 2018/0033166 A1    Feb. 1, 2018

Related U.S. Application Data

(60) Provisional application No. 62/011,608, filed on Jun. 13, 2014.

(51) Int. Cl.
*G06T 11/00* (2006.01)
*G06T 7/246* (2017.01)

(52) U.S. Cl.
CPC ........... *G06T 11/005* (2013.01); *G06T 7/248* (2017.01); *G06T 11/006* (2013.01);
(Continued)

(58) Field of Classification Search
USPC ........................................ 382/107
See application file for complete search history.

(56) References Cited

U.S. PATENT DOCUMENTS

2007/0048326 A1* 3/2007 Cairns ............ C07K 16/18
424/155.1
2010/0232645 A1* 9/2010 Blaffert ............ G06T 7/75
382/103
(Continued)

FOREIGN PATENT DOCUMENTS

| CN | 1408102 A | 4/2003 |
|---|---|---|
| CN | 101167662 A | 4/2008 |

(Continued)

OTHER PUBLICATIONS

PCT International Search Report and Written Opinion dated Aug. 31, 2015 (10 pages).
(Continued)

*Primary Examiner* — Jerome Grant, II (57) ABSTRACT

A set of first modality data is provided to an intra-reconstruction motion correction method. The set of first modality data includes a plurality of views. A set of second modality data is provided to the method. A motion estimate is generated for each of the plurality of views in the set of first modality data by registering the set of first modality data with the set of second modality data. A motion corrected model of the set of first modality data is generated by a forward projection including the motion estimate.

28 Claims, 12 Drawing Sheets

(52) U.S. Cl.
CPC ............ *G06T 2207/10081* (2013.01); *G06T 2207/10108* (2013.01); *G06T 2207/20004* (2013.01); *G06T 2207/20182* (2013.01); *G06T 2210/41* (2013.01); *G06T 2211/412* (2013.01); *G06T 2211/424* (2013.01)

(56) References Cited

U.S. PATENT DOCUMENTS

| | | | | |
|---|---|---|---|---|
| 2010/0289813 | A1* | 11/2010 | Nobe | A61B 6/032 345/597 |
| 2011/0142314 | A1* | 6/2011 | Hsieh | A61B 6/032 382/131 |
| 2011/0228897 | A1* | 9/2011 | Kobayashi | A61B 6/032 378/8 |
| 2012/0169333 | A1* | 7/2012 | Katscher | G06T 7/246 324/301 |
| 2013/0034286 | A1 | 2/2013 | Vija et al. | |
| 2013/0315459 | A1 | 11/2013 | Wollenweber et al. | |
| 2014/0072194 | A1 | 3/2014 | Hansis et al. | |
| 2014/0355855 | A1* | 12/2014 | Miao | A61B 5/721 382/131 |
| 2015/0302613 | A1* | 10/2015 | Hu | G06T 11/003 382/131 |
| 2016/0095565 | A1* | 4/2016 | Fenchel | A61B 5/0037 600/408 |
| 2016/0125605 | A1* | 5/2016 | Lee | G06T 11/008 382/131 |
| 2016/0203609 | A1* | 7/2016 | Wang | A61B 5/055 382/131 |
| 2016/0220311 | A1* | 8/2016 | Mansi | A61B 8/0883 |
| 2017/0193159 | A1* | 7/2017 | Cachovan | G06F 19/321 |
| 2017/0209112 | A1* | 7/2017 | Yi | A61B 6/5264 |
| 2017/0219674 | A1* | 8/2017 | VAn Der Kouwe | G01R 33/56509 |
| 2017/0278280 | A1* | 9/2017 | Ben-Haim | A61B 6/037 |
| 2017/0360325 | A1* | 12/2017 | Hebert | A61B 5/055 |
| 2018/0025512 | A1* | 1/2018 | Zhu | G06T 7/0081 |
| 2018/0033166 | A1* | 2/2018 | Cachovan | G06T 11/005 |
| 2018/0056091 | A1* | 3/2018 | Jordan | A61B 5/055 |
| 2018/0336677 | A1* | 11/2018 | Sloan | G06T 7/0012 |

FOREIGN PATENT DOCUMENTS

| | | |
|---|---|---|
| CN | 101408976 A | 4/2009 |
| CN | 102846326 A | 1/2013 |
| CN | 102982510 A | 3/2013 |
| CN | 103136734 A | 6/2013 |
| CN | 103417234 A | 12/2013 |
| CN | 104169969 A | 11/2014 |

OTHER PUBLICATIONS

Office Action and Translation for Corresponding Chinese Application No. 201580031250.4 dated Nov. 29, 2018.

\* cited by examiner

INTRA RECONSTRUCTION MOTION CORRECTION

CROSS-REFERENCE TO RELATED APPLICATION

This application claims priority under 35 U.S.C. § 119(e) to U.S. Provisional Application Ser. No. 62/011,608 filed Jun. 13, 2014 and U.S. Provisional Application Ser. No. 62/016,679, filed Jun. 25, 2014, each of which is hereby incorporated by reference herein in their entireties.

FIELD

Aspects of the present disclosure relate in general to processing data for medical imaging, and more particularly to techniques for intra reconstruction motion correction in medical image processing and generation.

BACKGROUND

Multi-modality imaging systems perform diagnostic scans using multiple modalities, such as, for example, magnetic resonance (MR/MRI), computed tomography (CT), positron emission tomography (PET), and/or single photon emission computed tomography (SPECT). Multiple modalities are combined to provide complimentary and/or overlapping data sets. During operation, image quality of one or more imaging modalities, such as a SPECT modality, can be affected by motion during imaging, for example, respiratory motion. When using a SPECT modality, imaging artifacts may be generated during image acquisition due to motion of the patient. In multi-modality systems, the SPECT modality requires a relatively long duration data acquisition period, on the order of several minutes (e.g., about 2 to 30 minutes per image) for a typical clinically sufficient image. Typically, a large number of SPECT data acquisitions (e.g., frames) are acquired at many different time points during this period. Consequently, patient movement is a qualitative and quantitative limiting factor in SPECT scanning.

Common current practice is to reacquire data for a patient who moves during acquisition. In current SPECT environments, list mode data (e.g., data wherein each event, or projection, is listed sequentially, parameter by parameter) is not available. Current systems acquire projections in a step and shoot fashion and cover only a limited number of angles. A projection image is generated by a sum of all detected events (e.g., projections) over a defined dwell time and incorporates gamma detections which have undergone various physical and biological phenomena, including patient movement. Motion is estimated using a global correction which averages the motion present over the whole acquisition duration and neglects any motion that happens between the different acquired views. Severe motion artifacts are generated due to the averaging.

SUMMARY

In various embodiments, a method of processing data for medical imaging is disclosed. The method comprises a step of providing a set of first modality data including a plurality of views. A set of second modality data is provided. A motion estimate for each of the plurality of views in the set of first modality data is generated by registering the set of first modality data with the set of second modality data. A motion corrected model of the set of first modality data is generated by forwarding projecting the set of first modality data including the motion estimate.

In various embodiments, a non-transitory, computer readable medium storing computer executable instructions is disclosed. The executable instructions cause a computer to execute a step of generating a set of first modality data including a plurality of views. The set of first modality data is generated by a first modality of an imaging system. The executable instructions further cause the computer to generate a set of second modality data including the plurality of views. The set of second modality data is generated by a second modality of the imaging system. The executable instructions further cause the computer to calculate a motion matrix for each of the plurality of views in the first modality data by registering the set of first modality data to the set of second modality data and generate a motion corrected model of the set of first modality data based on the generated movement data.

In various embodiments, a method of patient portion assessment is disclosed. The method comprises receiving a set of first modality data comprising a plurality of views and a set of second modality data comprising the plurality of views. The first modality of data is filtered to remove data points outside of a predetermined range. The set of first modality data is registered with the set of second modality data to reduce motion artifacts in the set of first modality data.

BRIEF DESCRIPTION OF THE DRAWINGS

The following will be apparent from elements of the figures, which are provided for illustrative purposes and are not necessarily to scale.

DETAILED DESCRIPTION

This description of the exemplary embodiments is intended to be read in connection with the accompanying drawings, which are to be considered part of the entire written description.

Various embodiments of the present disclosure address the foregoing challenges associated with qualitative and quantitative accuracy of medical imaging, for example, by utilizing an intra-reconstruction motion correction method that utilizes mapping of information with a first imaging modality to a second imaging modality.

Figure 1:
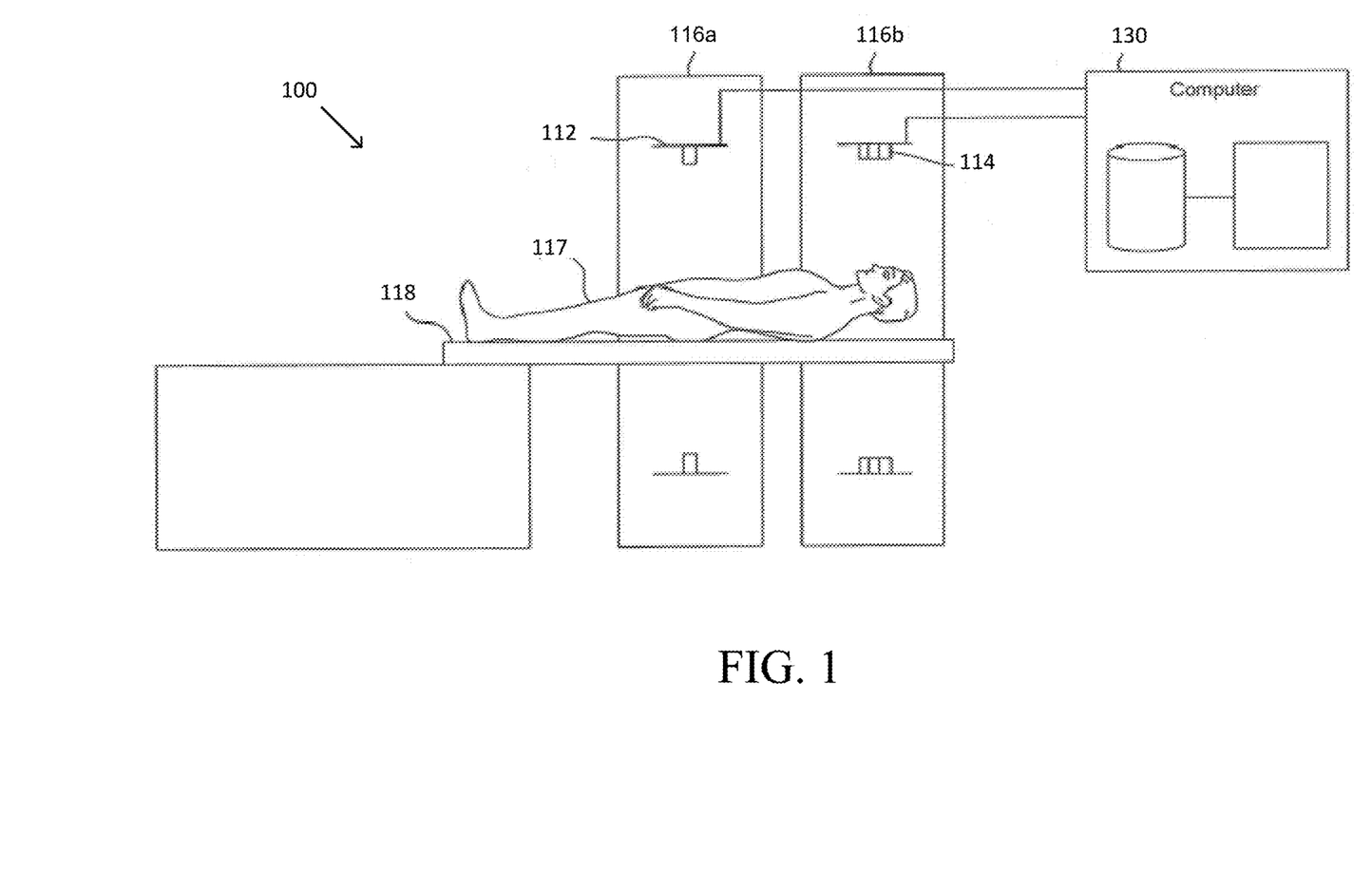
FIG. 1 illustrates one embodiment of a multi-modality imaging apparatus.

FIG. 1 shows one example of a multi-modality imaging apparatus 100. The multi-modality imaging apparatus 100 may be configured for two or more imaging modalities, such as, for example, combined PET/MR, PET/CT, SPECT/MR, SPECT/CT, and/or any other suitable combined diagnostic imaging modalities. The multi-modality imaging apparatus 100 includes a scanner for at least a first imaging modality 112 provided in a first gantry 116a and a scanner for a second imaging modality 114 provided in a second gantry 116b. In various embodiments, SPECT and CT are described as examples of first and second imaging modalities respectively that may be used in various embodiments, but it will be recognized that SPECT and CT are non-limiting examples. A patient 117 lies on a movable patient bed 118 that may be movable between the gantries. Alternatively, the two imaging modalities 112 and 114 may be combined together in a single gantry.

Scan data from at least the first and second imaging modalities 112, 114 are stored at one or more computer databases 140 and processed by one or more computer processors 150 of a computer 130. Scan data from the first and second imaging modalities may be stored in the same database 140 or in separate databases. The graphical depiction of computer 130 in FIG. 1 is provided by way of illustration only, and computer 130 may include one or more separate computing devices. In some embodiments, the computer 130 is configured to generate a partial and/or a whole body reconstructed image from a first modality data set and a second modality data set. The first and second modality data sets can be provided by the first imaging modality 112 and the second imaging modality 114 and/or may be provided as a separate data set, such as, for example, from memory coupled to the computer 130.

In some embodiments, the first and second imaging modalities 112, 114 are SPECT and CT modalities, respectively. For example, a patient can be scanned with the first imaging modality 112 and the second imaging modality 114 to yield SPECT acquisition and physiological waveform data and segmented CT data, respectively. The scans may be performed sequentially, with a CT scan following a SPECT scan, and/or simultaneously. In another embodiment, the first imaging modality 112 is CT and the second imaging modality 114 is SPECT. In some embodiments, the second imaging modality 114 is a nuclear imaging modality.

In some embodiments, the data acquisition time of one of the imaging modalities, such as, for example, the first imaging modality 112, is greater than the data acquisition time of the other imaging modality, for example, the second imaging modality 114. In some embodiments, the first imaging modality 112 is a SPECT imaging modality and the second imaging modality 114 is a CT imaging modality. The SPECT imaging modality is configured to acquire a plurality of views (or angles). Each angle comprises a plurality of projections detected by the SPECT imaging modality over a predetermined time period. In some embodiments, each view in the SPECT image data may be acquired over a 15s period. Due to the length of each acquisition of the SPECT imaging modality, patient motion limits the qualitative and quantitative accuracy of each obtained view. The CT imaging modality is configured to acquire a similar plurality of views as the SPECT imaging modality. The CT imaging modality obtains each view over a shorter predetermined time period, such as, for example, two seconds. The shorter time period of the CT imaging modality avoids the introduction of motion errors and allows for motion correction of the SPECT imaging modality.

In some embodiments, gating is performed based on an acquired physiological signals to determine gate locations (in time) and a width (in time duration) for one or more gates. Any gating algorithm known in the art can be used for this purpose. Gate width (the time duration of a gate) depends on the imaging modality. The widths (time durations) of respective gates in a cycle may be constant or may vary, e.g., depending on the gating algorithm that is used and the constraints of the imaging modality.

Although combined SPECT and CT system are discussed herein, it will be recognize that the disclosed systems and methods are applicable to any combined modalities, such as, for example, MR/PET, CT/PET, MR/SPECT, and/or CT/SPECT.

Figure 2:
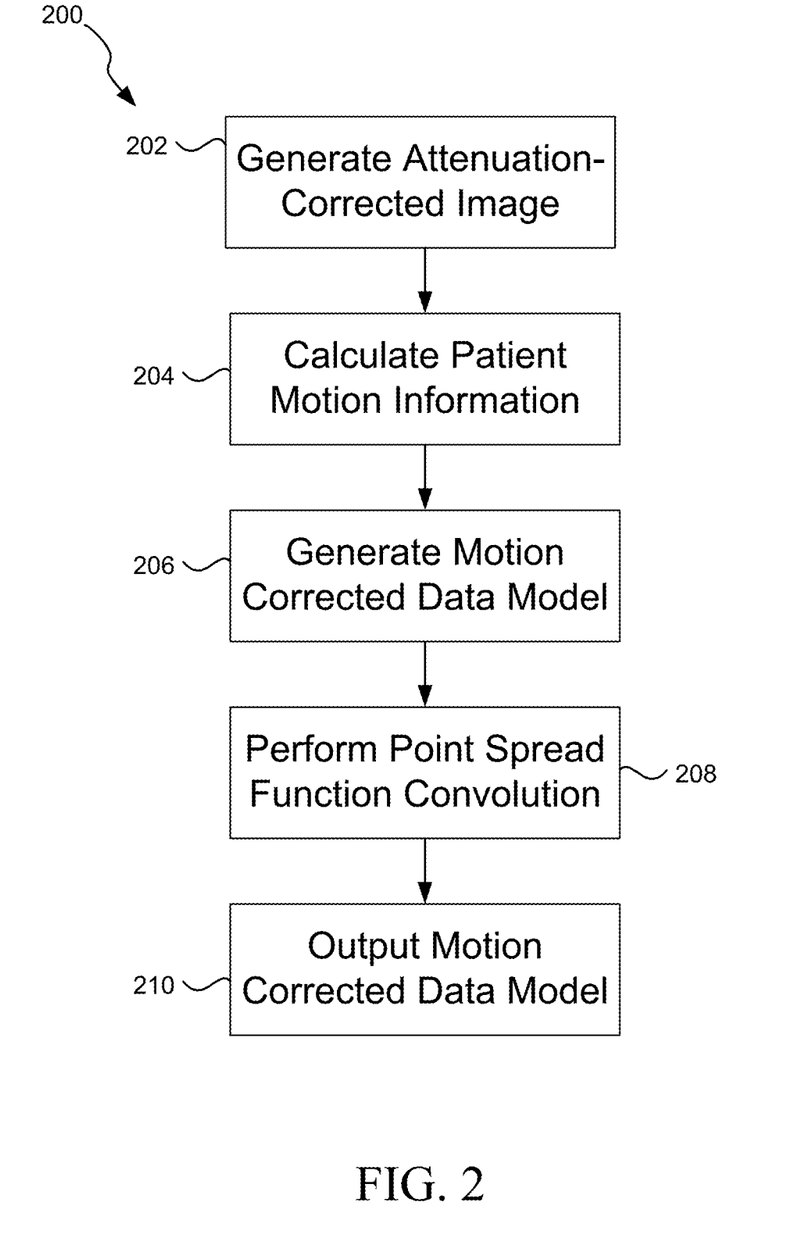
FIG. 2 illustrates one embodiment of a method for motion corrected forward projection.

In some embodiments, a method of intra-reconstruction motion correction is applied to one or more sets of imaging data acquired by the imaging apparatus 100. The intra-reconstruction motion correction method corrects for inter-view motion and enables corrections on a view by view basis. FIG. 2 illustrates one embodiment of an intra-reconstruction motion correction method 200. The intra-reconstruction motion correction method 200 is applied to each view in a set of first modality data, such as, for example, a set of first modality data obtained by the first imaging modality 112 of the imaging apparatus 100. In some embodiments, the first modality is a SPECT modality, although it will be appreciated that the intra-reconstruction motion correction method 200 may be applied to any suitable modality data set.

At step 202, an attenuation-corrected image for a current view in the set of first modality data is generated. In some embodiments, the attenuation-corrected image is generated by combining one or more angle-dependent (or view-dependent) attenuation maps and a data model of the current view in the projection space. In some embodiments, each angle-specific attenuation map is pre-computed and provided to a system implementing the intra-reconstruction motion correction method 200. Such system can be the computer 130 of imaging apparatus 100. In other embodiments, each attenuation map is calculated as part of the intra-reconstruction motion correction method. The data model can be pre-generated and/or generated during the method. Generation of the data model can incorporate one or more modeling processes, such as, for example, acquisition information correction, gantry deflection correction, and/or any other required system modeling processes. The attenuation maps and the data model can be combined by, for example, a tensor function to generate an attenuation-corrected data model. In some embodiments, attenuation correction is performed simultaneously with other parts of the intra-reconstruction motion correction method.

At step 204, patient motion information is calculated for the current view of the first modality data. The patient motion information may be calculated by, for example, a patient motion assessment tool. The patient motion assessment tool is configured to perform motion estimation in the image space and/or the projection space. The patient motion assessment tool utilizes a set of second modality data (such as, for example, CT and/or MR data) which is projected into the projection data space of the set of first modality data. The projected second modality data is registered (e.g., aligned) with the set of first modality data on a view-to-view basis.

In some embodiments, the set of second modality data is segmented to separate significant tissue from non-significant tissue. A rigid and/or a non-rigid registration technique may be used to align the set of first modality data with the set of second modality data. The set of second modality data may be obtained by the second imaging modality 114 of the imaging apparatus 100 and/or may be provided by a remote system. The second imaging modality 114 may comprise any suitable imaging modality, such as, a morphological modality (e.g., CT, MR, etc.) and/or a nuclear modality (e.g., PET). Although exemplary patient motion assessment tools are disclosed herein, it will be understood that the intra-reconstruction motion correction method 200 may incorporate alternative and/or additional patient motion assessment tools, such as, using tracking devices, registration techniques, and/or data tracking techniques.

Figure 3:
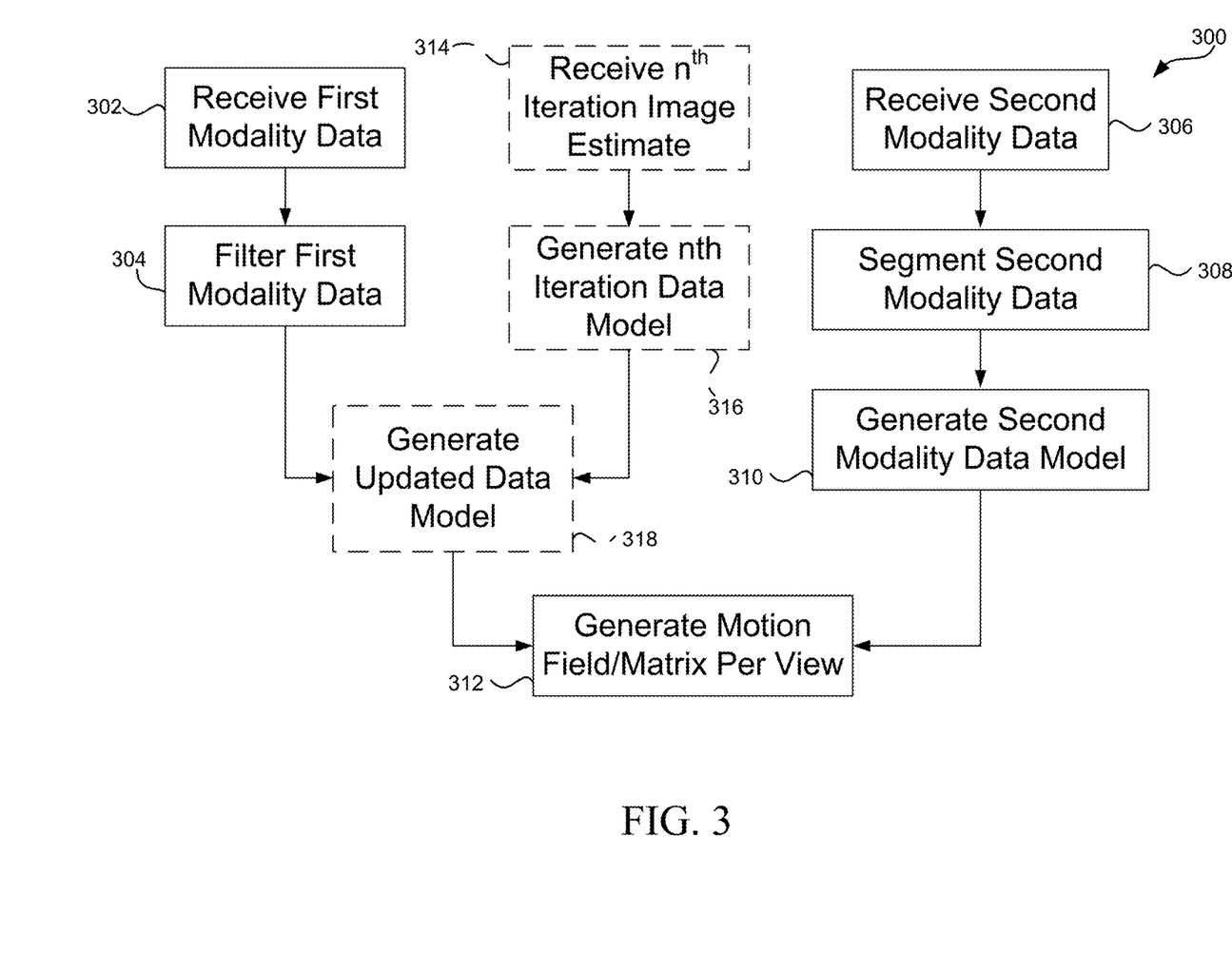
FIG. 3 illustrates one embodiment of a patient motion assessment method configured to generate a motion estimate in a projection space.

FIG. 3 illustrates one embodiment of a patient motion assessment method 300 configured to generate a motion estimate in a projection space. At step 302, a set of first modality projection data is received by a system configured to implement the patient motion assessment method 300, such as the computer 130. At step 304, the set of first modality projection data is filtered. The set of first modality data may be filtered by, for example, an adaptive and/or non-adaptive filter to remove anomalous data points such as, projection data points outside of a predetermined range. At step 306, a set of second modality data is provided to the system. As noted above, the second modality may comprise a morphological modality (e.g., CT/MR) and/or a nuclear modality (e.g., PET). At step 308, the set of second modality data is segmented to isolate target anatomical structures, such as, specific organs, skeletal structures, and/or any other target anatomical structure. For example, in one embodiment, the set of first modality data is obtained through SPECT scan of a patient having a tracer element, such as Tc-99m-DPD, that accumulates predominately in a skeletal structure, injected therein. The set of second modality data is segmented to extract data corresponding to the skeletal structure, for example, of a rib cage. At step 310, a model of the set of second modality data is generated. The second modality data model may be generated by any suitable method, such as a forward projection method. The forward projection of the set of second modality data may be performed by any suitable forward projection algorithm, such as a pencil beam forward projection algorithm.

At step 312, motion information, such as a motion field or a motion matrix, is generated by registering the first modality data model with the second modality data model. The set of first modality data is registered (e.g., aligned) with the second modality data model to correct the motion artifacts in the set of first modality data caused by any movements of a patient during data acquisition. The registration technique can include a rigid and/or non-rigid registration technique. The motion information may include a 2D displacement and/or a 2D rigid transformation for each projection in the first data set.

In some embodiments, the alignment between the first modality data model and the second modality data model is iteratively improved by generating an updated first modality data model. In some embodiments, the patient motion assessment method 300 includes an optional step 314 of receiving a reconstructed image estimate generated by the $n^{th}$ iteration of the intra-reconstruction motion correction method 200. At the associated optional step 316, an $n^{th}$ reconstruction data model is generated from the $n^{th}$ iteration image estimate. The $n^{th}$ reconstruction data model can be generated by any suitable method, such as a forward projection into the projection space.

At step 318, an updated first modality data model is generated from the first modality data model and the $n^{th}$ iteration data model. For example, in some embodiments, the first modality data model is compared to the $n^{th}$ iteration data model to generate an update factor for the first modality data. The update factor is back projected into the image space and is used to update the first modality data. In some embodiments, the back projection method comprises the reverse of the intra-reconstruction forward projection method 200. The updated first modality data is forward projected to generate an updated data model for use in the patient motion assessment method 300. In some embodiments, the first modality data model is updated after each $n^{th}$ iteration of the intra-reconstruction motion correction method 200.

Figure 4:
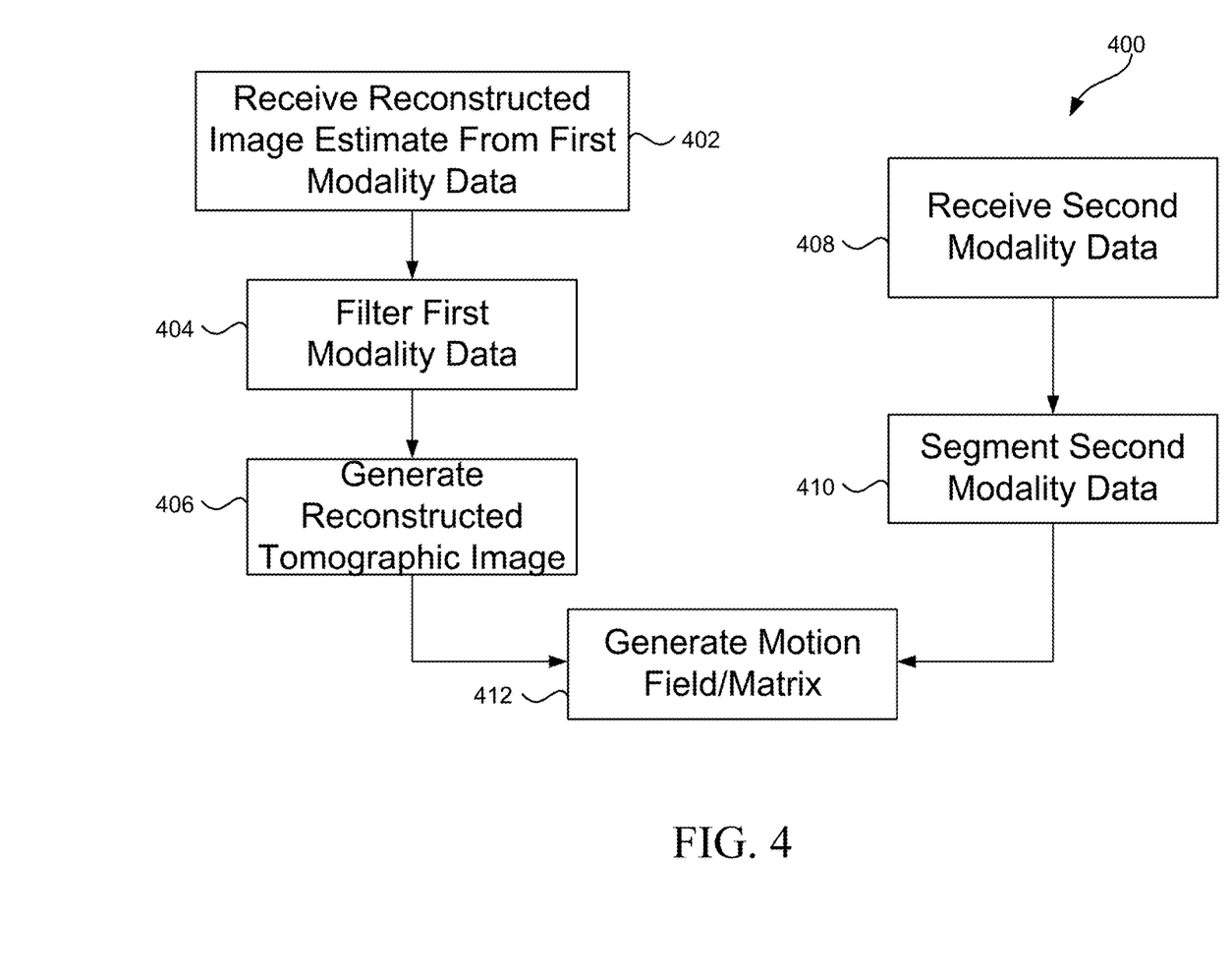
FIG. 4 illustrates one embodiment of a patient motion assessment method configured to generate a motion estimate in an image space.

FIG. 4 illustrates another embodiment of a patient motion assessment method 400 configured to generate a motion estimate in an image space. At step 402, an image estimate is reconstructed from a subset of tomographic and motion consistent first modality data. At step 404, the subset of first modality data is filtered. Any suitable filter, such as, for example, an adaptive and/or non-adaptive filter may be used to filter the set of first modality data. Then at step 406, a filtered reconstructed tomographic first modality image estimate is generated. At step 408, a set of second modality data is provided. As noted above, the second modality can comprise any suitable modality, such as, for example, a morphological modality (e.g., CT/MR) and/or a nuclear modality (e.g., PET). In some embodiments, the set of second modality data can be segmented at step 410 to isolate relevant anatomical structures.

At step 412, a motion field/motion matrix is generated by comparing the first modality image estimate and the second modality image estimate. In some embodiments, the motion field/motion matrix is generated by registering (e.g. aligning) the first modality image estimate and the second modality image estimate. The registration technique can comprise a rigid and/or non-rigid registration technique. In some embodiments, registration of the first modality image estimate and the second modality image estimate generates a 2D displacement and/or a 3D rigid transformation for the first modality view data.

After calculating the motion estimate, the patient motion assessment tool outputs motion matrices and/or motion fields to the intra-reconstruction motion correction method 200. Although patient motion assessment tools utilizing registration between a first modality data set and a second modality data set are disclosed, it will be appreciated that the patient motion assessment tool may generate one or more motion matrices and/or motion fields using any suitable method and/or information. For example, in some embodiments, the patient motion assessment tool is configured to generate one or more motion estimates using range imaging sensor data and/or any other suitable data.

Referring back to FIG. 2, at step 206, the motion estimate is used to generate a motion corrected first modality data model. In various embodiments, the motion correction includes a forward projection configured to generate a 3D rotation for rigid deflections, a projection line deflection, and/or any other suitable rigid and/or non-rigid deflection.

Figure 5:
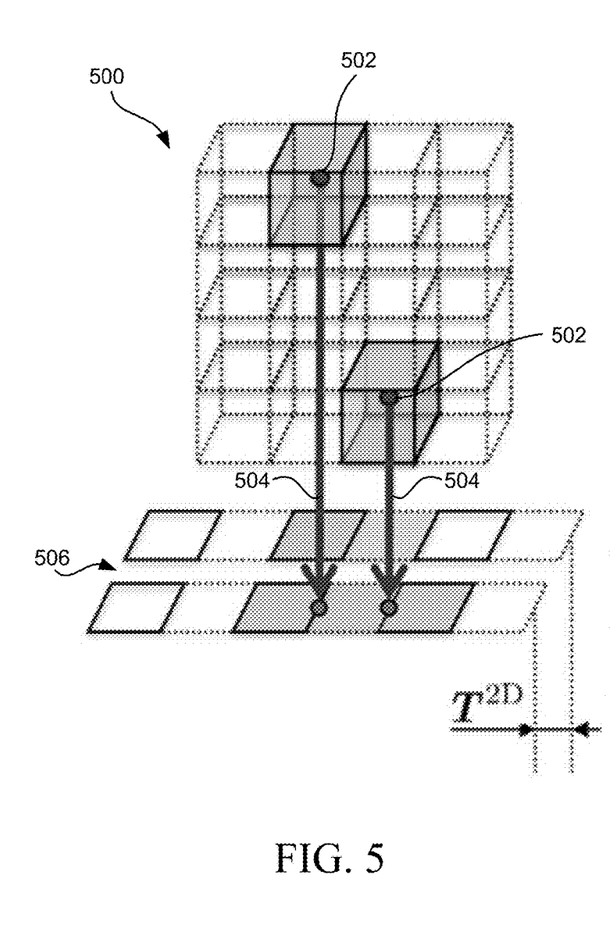
FIG. 5 illustrates one embodiment of a rigid displacement in the projection space.
Figure 6:
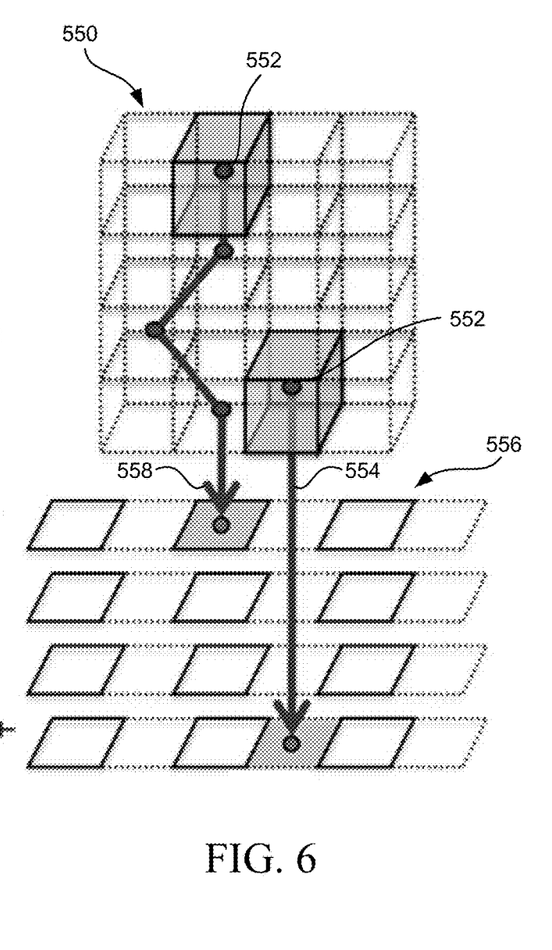
FIG. 6 illustrates one embodiment of a non-rigid displacement in the projection space.

FIG. 5 illustrates one embodiment of a rigid deflection. As shown in FIG. 5, each point 502 in the first modality view data is projected along a rigid path 504 into a projection space 506. FIG. 6 illustrates one embodiment of a non-rigid projection. As shown in FIG. 6, each point 552 in the first modality view data can be projected along a rigid path 554 and/or a non-rigid path 558. In some embodiments, the attenuation-corrected image data is forward projected from an image space to a projection space. In some embodiments, the forward projection is a point projection, although any suitable projection may be used.

At step 208, a point spread function convolution is performed to model a depth dependent detector response of the first modality. In some embodiments, a Fast Fourier Transform (FFT) of the motion-corrected model is performed. The FFT of the motion-corrected model is combined with a Point Spread Function (PST) in the FFT domain through a tensor product. The tensor products of each model for each view in the first data set is summed and an Inverse Fast Fourier Transform (IFFT) generates an intra-reconstruction motion-corrected data model from the sum of the tensor products. The intra-reconstruction motion-corrected data model may be used for diagnostic and/or other medical imaging purposes.

Patient motion information calculated at step 204 by the patient motion assessment tool includes an adapted system matrix. The adapted system matrix ($A^T$) can be represented by the equation:

$$A^T = PTK^{PSF}M$$

wherein P is a projector, T is a motion operator, $K^{PSF}$ is the point spread function convolution operator, and M is the attenuation correction operator. The adapted system matrix is used to generate 206 the motion-corrected model. For example, in some embodiments, the motion-corrected model is generated 206 according to the equation:

$$\hat{f}_j^{(n+1)} = \frac{\hat{f}_j^{(n)}}{\sum_i a_{ij}^{(T)}} \sum_i a_{ij}^{(T)} \frac{g_i}{\sum_k a_{ik}^{(T)} \hat{f}_k^{(n)} + \hat{s}_k}$$

wherein f is the image, $a_{ij}$ is an element of the adapted system matrix $A^T$, g is the view data, and s is a scatter estimate.

Figure 7:
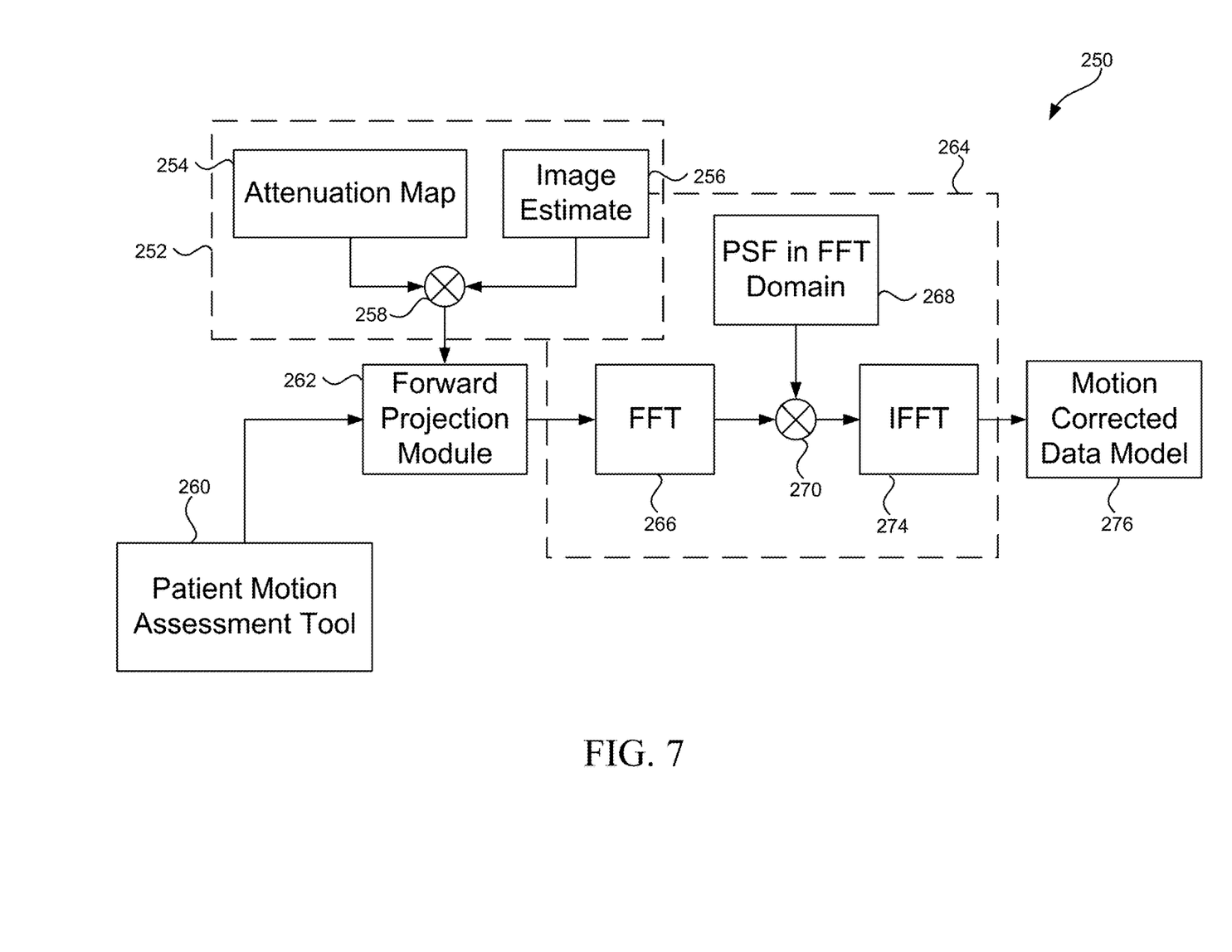
FIG. 7 illustrates one embodiment of a system configured to generate an intra-reconstruction motion-corrected data model.

FIG. 7 illustrates one embodiment of a system 250 configured to implement the intra-reconstruction motion-corrected method of FIG. 2. The system 250 includes an attenuation correction module 252. The attenuation correction module 252 receives one or more pre-computed attenuation maps 254 from a remote source, such as a memory module coupled to the system 250. A data model 256 is constructed from a set of first modality data. The attenuation correction module 252 generates an attenuation-corrected data model by taking the tensor product 258 of the attenuation map(s) 254 and the data model 256. The attenuation-corrected data model is provided to a forward projection module 262. The forward projection module 262 also receives a patient motion estimate from a patient motion assessment tool 260. The patient motion assessment tool 260 is configured to generate one or more motion matrices and/or motion fields. The patient motion assessment tool 260 can generated the patient motion estimate by any suitable method, such as, for example, by registering the set of first modality data with a set of second modality data. For example, the patient motion assessment tool 260 may be configured to implement one or more of the methods described in conjunction with FIGS. 3 and 4. The patient motion estimation tool 260 provides the motion matrices and/or motion fields to the forward projection module 262.

The forward projection module 262 is configured to generate a motion-corrected forward projection of the attenuation-corrected data model. The forward projection module 262 is configured to apply one or more motion-correction methods, such as, for example, the motion-correction method 200 described in conjunction with FIG. 2. The forward projection module 262 generates a motion-corrected data model in the projection space of the first modality data. In some embodiments, the forward projection module 262 provides the motion-corrected data model to a point spread convolution module 264. The point spread convolution module 264 applies a Fast Fourier Transform (FFT) 266 to the motion-corrected data model. The FFT is combined with a Point-Spread Convolution (PSF) 268 in the FFT domain. The FFT and the PSF are combined by a tensor product 270. The tensor product for each motion-corrected data model in a view is summed 272 and converted back into a data model by an Inverse Fast Fourier Transform (IFFT) 274. The motion-corrected data model 276 is output by the point spread convolution module 264. The motion-corrected data model 276 may be displayed by any suitable display, stored in a memory module coupled to the system 250, and/or provided to a user for diagnostic and/or other medical purposes.

Figure 8A:
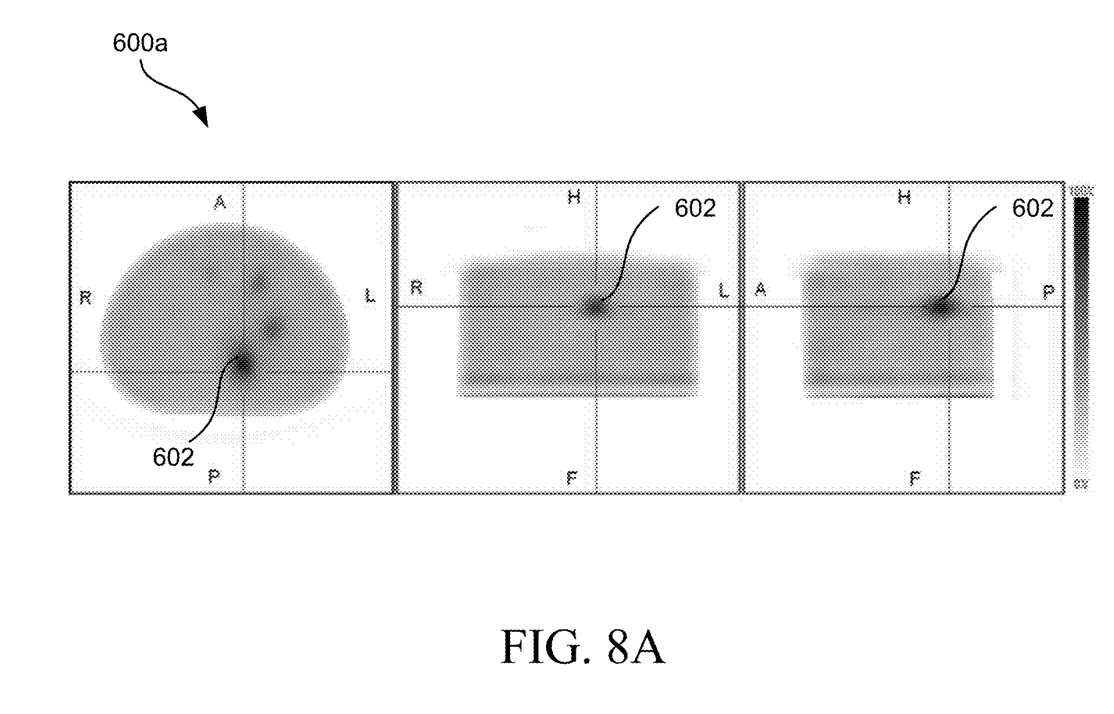
FIG. 8A illustrates one embodiment of an original IEC phantom.
Figure 8B:
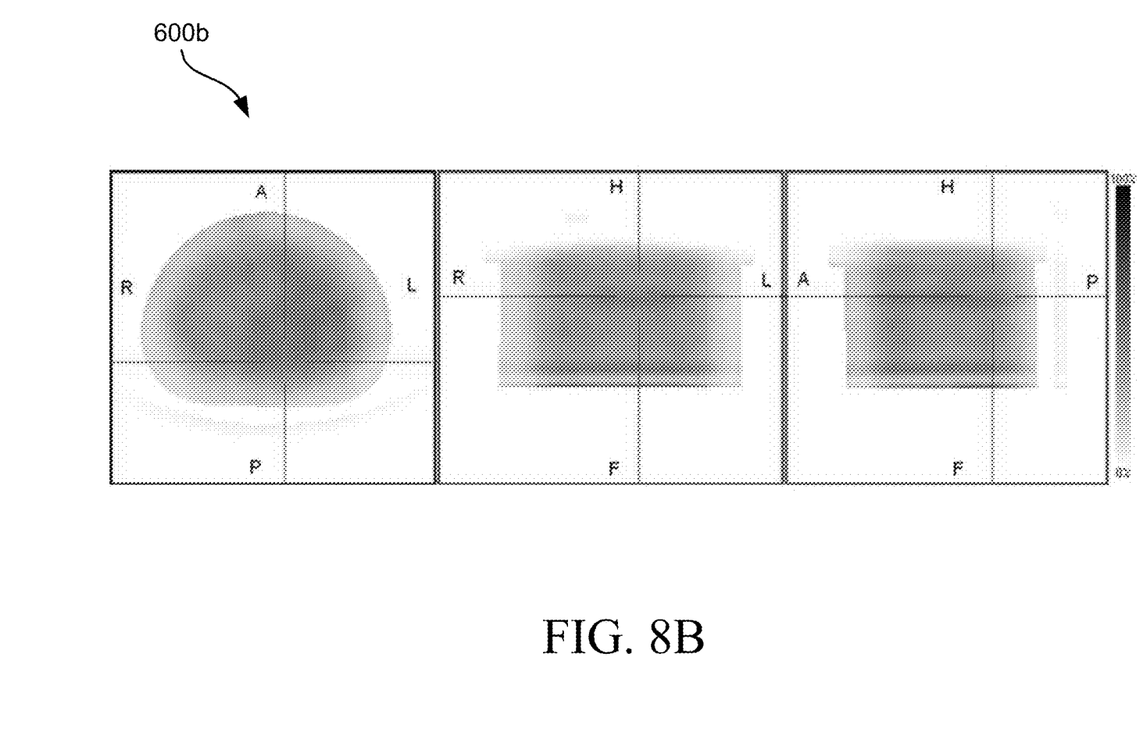
FIG. 8B illustrates one embodiment of a randomized IEC phantom simulating motion during acquisition of a first imaging modality.
Figure 8C:
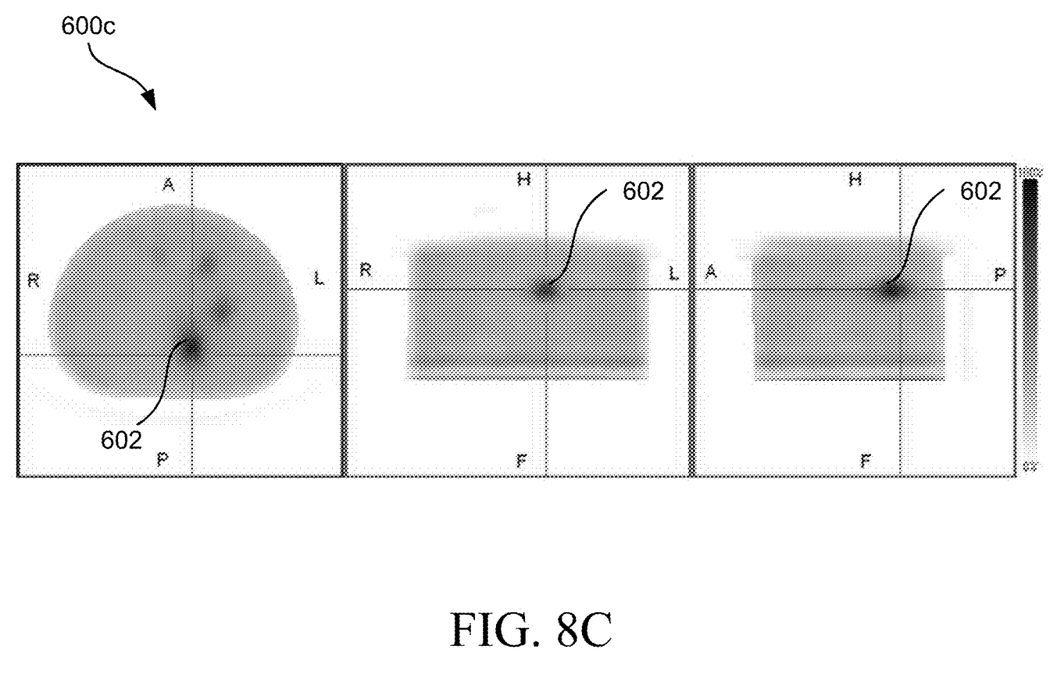
FIG. 8C illustrates one embodiment of a motion-corrected IEC phantom generated by applying the motion correction algorithms disclosed herein to the randomized IEC phantom of FIG. 8B.

FIGS. 8A-8C illustrate one embodiment of the intra-reconstruction motion correction method 200 of FIG. 2 applied to a phantom. FIG. 8A illustrates one embodiment of a phantom 600a having a single target sphere 602 therein. The data of the phantom 600a is randomized to simulate movement of a patient during data acquisition. The randomized phantom 600b is shown in FIG. 8B. As can be seen in FIG. 8B, the target sphere 602 is not visible in the motion-simulated phantom 600b. The motion-simulated phantom 600b has an error rate of about 50% as compared to the original phantom 600a. The intra-reconstruction motion correction method 200 of FIG. 2 is applied to the randomized phantom 600b. A motion corrected reconstruction 600c is illustrated in FIG. 8C. As shown in FIG. 8C, the target sphere 602 is visible in the motion corrected phantom 600c. The motion-corrected phantom 600c has an error rate of about 5% as compared to the original phantom 600a.

Figure 9A:
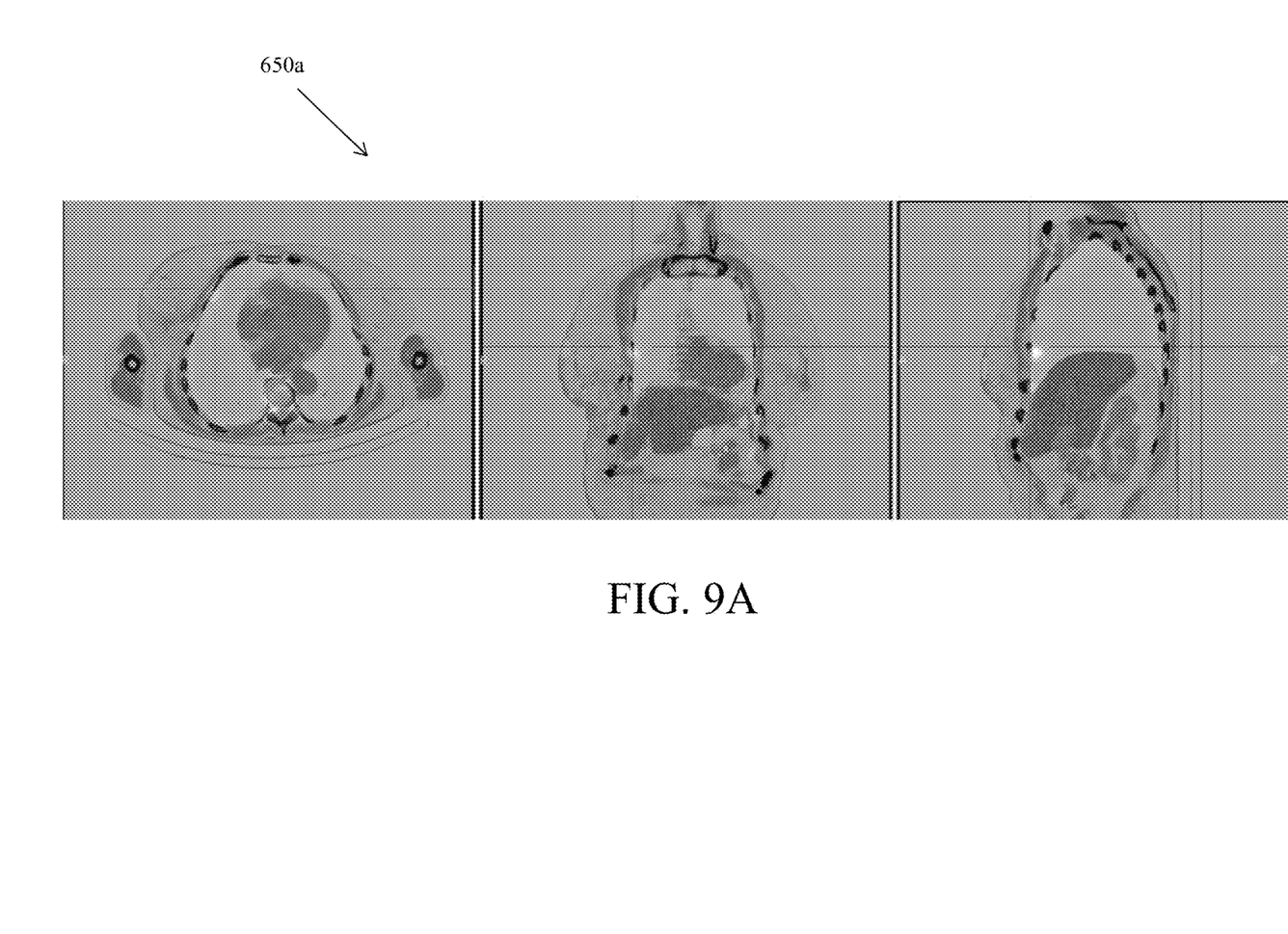
FIG. 9A illustrates an original reconstruction of rib region of a patient.
Figure 9B:
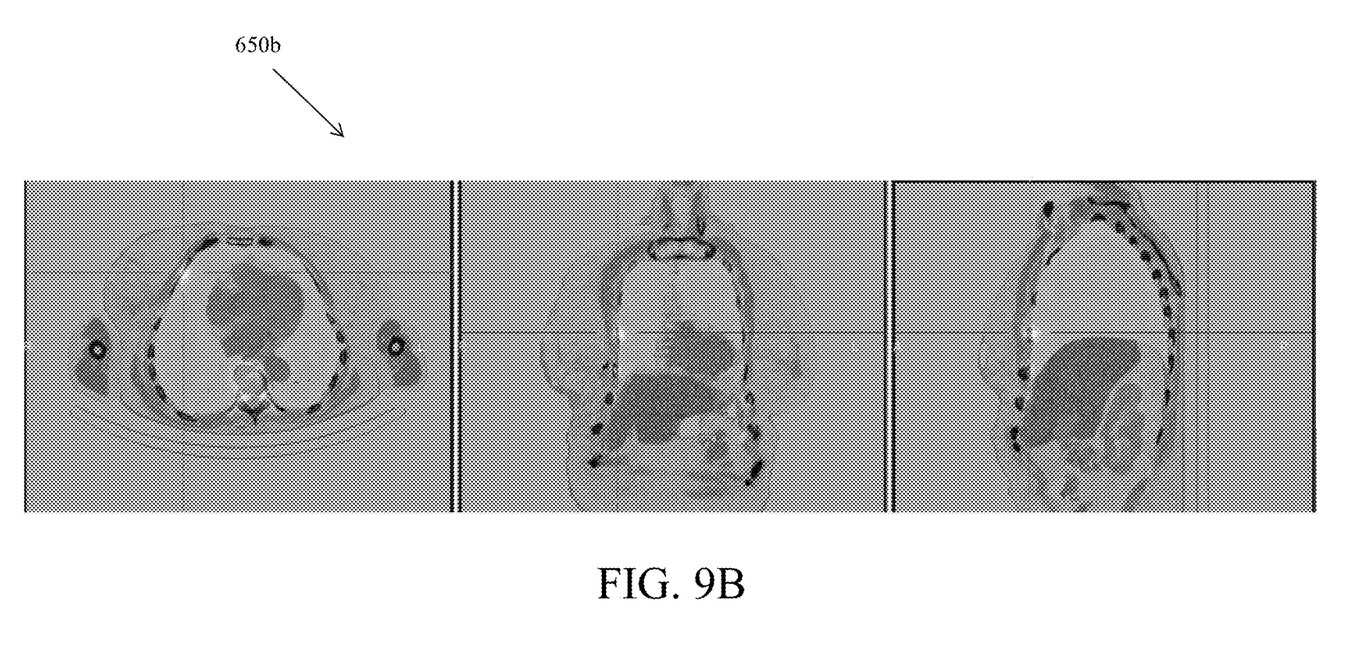
FIG. 9B illustrates a motion-corrected reconstruction of the rib region of FIG. 9A.

FIGS. 9A-9B illustrate one embodiment of the intra-reconstruction motion correction method 200 applied to a SPECT scan of a patient's rib cage. FIG. 9A illustrates an original SPECT scan 650a of a rib cage. As shown in FIG. 9A, the image includes several artifacts produced by patient movement during the scan. FIG. 9B illustrates the SPECT scan 650a of FIG. 9A having the intra-reconstruction motion correction method 200 applied thereto. As shown in FIG. 9B, the motion-corrected SPECT scan 650b shows an improvement of image conspicuity in the ribs and rib lesions shown in the SPECT scan 650b.

Figure 10:
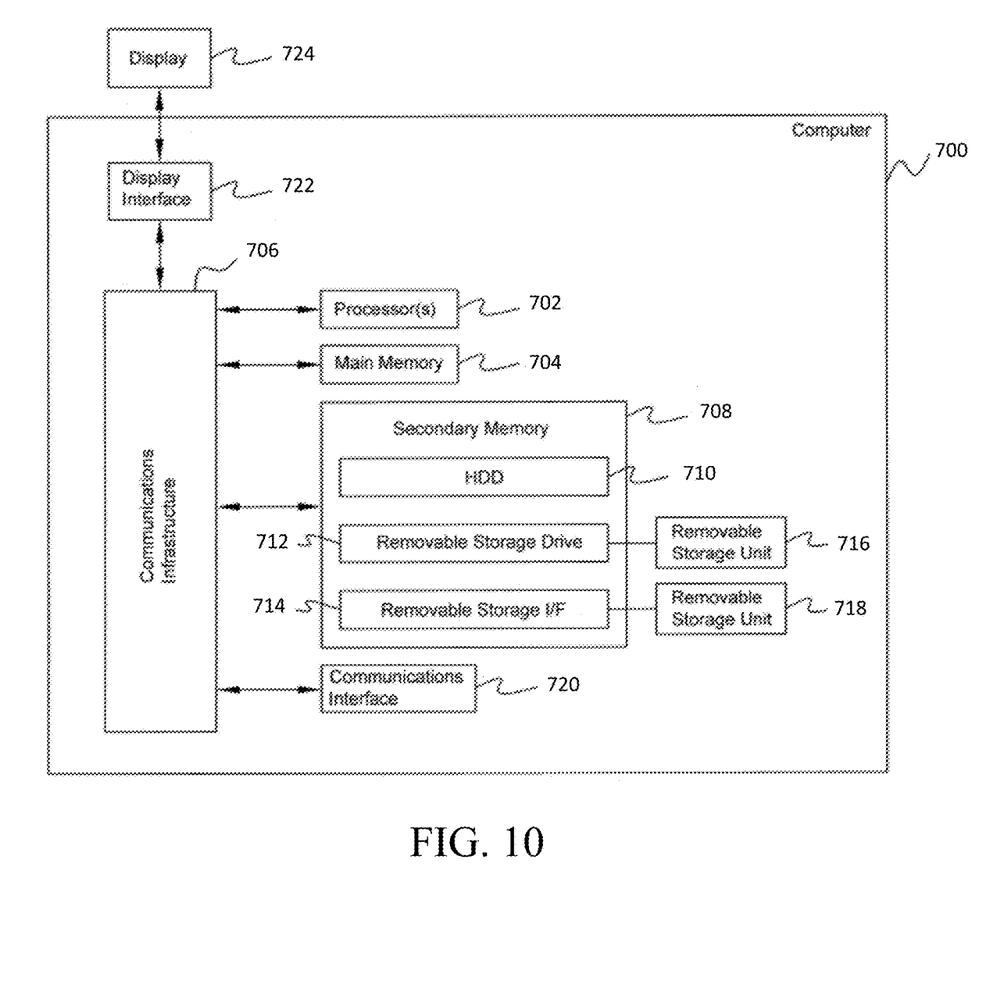
FIG. 10 is an architecture diagram of a computer system that may be used in some embodiments.

FIG. 10 is an architecture diagram of a computer system 700 that may be used in some embodiments, e.g., for implementing the computer 130 shown in FIG. 1. Computer system 700 may include one or more processors 702. Each processor 702 is connected to a communication infrastructure 706 (e.g., a communications bus, cross-over bar, or network). Computer system 700 may include a display interface 722 that forwards graphics, text, and other data from the communication infrastructure 706 (or from a frame buffer, not shown) for display on the display unit 724 to a user.

Computer system 700 may also include a main memory 704, such as a random access memory (RAM), and a secondary memory 708. The main memory 704 and/or the secondary memory 708 comprise non-transitory memory. The secondary memory 708 may include, for example, a hard disk drive (HDD) 710 and/or removable storage drive 712, which may represent a floppy disk drive, a magnetic tape drive, an optical disk drive, a memory stick, or the like as is known in the art. The removable storage drive 712 reads from and/or writes to a removable storage unit 716. Removable storage unit 716 may be a floppy disk, magnetic tape, optical disk, or the like. As will be understood, the removable storage unit 716 may include a computer readable storage medium having tangibly stored therein (embodied thereon) data and/or computer software instructions, e.g., for causing the processor(s) to perform various operations.

In alternative embodiments, secondary memory 708 may include other similar devices for allowing computer programs or other instructions to be loaded into computer system 700. Secondary memory 708 may include a removable storage unit 718 and a corresponding removable storage interface 714, which may be similar to removable storage drive 712, with its own removable storage unit 716. Examples of such removable storage units include, but are not limited to, USB or flash drives, which allow software and data to be transferred from the removable storage unit 716, 718 to computer system 700.

Computer system 700 may also include a communications interface (e.g., networking interface) 720. Communications interface 720 allows software and data to be transferred between computer system 700 and external devices. Examples of communications interface 720 may include a modem, Ethernet card, wireless network card, a Personal Computer Memory Card International Association (PCMCIA) slot and card, or the like. Software and data transferred via communications interface 720 may be in the form of signals, which may be electronic, electromagnetic, optical, or the like that are capable of being received by communications interface 720. These signals may be provided to communications interface 720 via a communications path (e.g., channel), which may be implemented using wire, cable, fiber optics, a telephone line, a cellular link, a radio frequency (RF) link and other communication channels.

The apparatuses and processes are not limited to the specific embodiments described herein. In addition, components of each apparatus and each process can be practiced independent and separate from other components and processes described herein.

The previous description of embodiments is provided to enable any person skilled in the art to practice the disclosure. The various modifications to these embodiments will be readily apparent to those skilled in the art, and the generic principles defined herein may be applied to other embodiments without the use of inventive faculty. The present disclosure is not intended to be limited to the embodiments shown herein, but is to be accorded the widest scope consistent with the principles and novel features disclosed herein.

What is claimed is:

1. A method of processing data for medical imaging, the method comprising:
   providing a set of first modality data including a plurality of views from a first imaging modality;
   providing a set of second modality data from a second imaging modality;
   generating a motion estimate from each of the plurality of views in the set of first modality data by registering the set of first modality data with the set of second modality data;
   generating a motion corrected model of the set of first modality data by forwarding projecting the set of first modality data including the motion estimate; and
   wherein neither the first nor the second image modality comprises Magnetic Induction Tomography.

2. The method of claim 1, wherein the motion corrected model is generated by deflecting each projection in the first modality data based on the motion estimate.

3. The method of claim 2, wherein the motion estimate comprises an adapted system matrix.

4. The method of claim 3, wherein the adapted system matrix is represented by the equation:

$$A^T = PTK^{PSF}M$$

wherein P is a projector, T is a motion operator, $K^{PSF}$ is the point spread function convolution operator, and M is the attenuation correction operator.

5. The method of claim 3, wherein the motion corrected model is generated according to the equation:

$$\hat{f}_j^{(n+1)} = \frac{\hat{f}_j^{(n)}}{\sum_i a_{ij}^{(T)}} \sum_i a_{ij}^{(T)} \frac{g_i}{\sum_k a_{ik}^{(T)} \hat{f}_k^{(n)} + \hat{s}_k}$$

wherein f is the motion-corrected model, $a_{ij}$ is an element of the adapted system matrix $A^T$, g is a subset of the first modality data, and s is a scatter estimate.

6. The method of claim 1, wherein the motion estimate is generated by a patient motion assessment tool.

7. The method of claim 6, wherein the patient motion assessment tool generates a motion estimation in a projection space.

8. The method of claim 6, wherein the patient motion assessment tool generates a motion estimation in an image space.

9. The method of claim 1, wherein the first imaging modality is the nuclear imaging modality comprising a SPECT imaging modality and the second imaging modality comprises a CT imaging modality.

10. The method of claim 1, comprising performing a point spread function convolution of the motion-corrected model to identify a depth dependent detector response.

11. The method of claim 1, wherein the motion-corrected model is iteratively updated by comparing the first modality data to an nth iteration-motion corrected model to generate updated first modality data, wherein the nth iteration motion-corrected model is a motion-corrected model generated by an nth iteration of the method of processing data.

12. A computer readable storage medium, tangibly embodying a program of instructions executable by a processor to cause the processor to perform the steps of:
   generating a set of first modality data including a plurality of views, wherein the set of first modality data is generated by a first modality of an imaging system;
   generating a set of second modality data including the plurality of views, wherein the set of second modality data is generated by a second modality of the imaging system;

calculating a motion matrix for each of the plurality of views in the first modality data by registering the set of first modality data to the set of second modality data; and generating a motion corrected model of the set of first modality data based on the generated movement data, wherein the computer readable medium is non-transitory.

13. The non-transitory, computer readable medium of claim 12, wherein the motion corrected model is generated by deflecting each projection in the first modality data based on the movement data.

14. The non-transitory, computer readable medium of claim 13, wherein the motion matrix is an adapted system matrix.

15. The non-transitory, computer readable medium of claim 14, wherein the adapted system matrix is represented by the equation:

$A^T = PTK^{PSF}M$ wherein P is a projector, T is a motion operator, $K^{PSF}$ is the point spread function convolution operator, and M is the attenuation correction operator.

16. The non-transitory, computer readable medium of claim 14, wherein the motion corrected model is generated according to the equation:

$$\hat{f}_j^{(n+1)} = \frac{\hat{f}_j^{(n)}}{\sum_i a_{ij}^{(T)}} \sum_i a_{ij}^{(T)} \frac{g_i}{\sum_k a_{ik}^{(T)} \hat{f}_k^{(n)} + \hat{s}_k}$$

wherein f is the motion-corrected model, $a_{ij}$ is an element of the adapted system matrix $A^T$, g is a subset of the first modality data, and s is a scatter estimate.

17. The non-transitory, computer readable medium of claim 12, wherein the movement data is generated by a patient motion assessment tool.

18. The non-transitory, computer readable medium of claim 17, wherein the patient motion assessment tool comprises a motion estimation in a projection space.

19. The non-transitory, computer readable medium of claim 17, wherein the patient motion assessment tool comprises a motion estimation in an image space.

20. The non-transitory, computer readable medium of claim 12, wherein movement data is generated by estimating motion fields.

21. Method of patient motion assessment, comprising:
receiving a set of first modality data comprising a plurality of views from a first imaging modality;
receiving a set of second modality data comprising the plurality of views from a second imaging modality;
filtering the first modality of data to remove data points outside of a predetermined range;
registering the set of first modality data with the set of second modality data to reduce motion artifacts in the set of first modality data; and
wherein neither the first nor the second image modality comprises Magnetic Induction Tomography.

22. The method of claim 21, wherein the registering is completed by one of a rigid registration technique or a non-rigid registration technique.

23. A method of processing data for medical imaging, the method comprising:
providing a set of first modality data including a plurality of views;
providing a set of second modality data;
generating a motion estimate for each of the plurality of views in the set of first modality data by registering the set of first modality data with the set of second modality data; and
generating a motion corrected model of the set of first modality data by forwarding projecting the set of first modality data including the motion estimate, wherein the motion corrected model is generated by deflecting each projection in the first modality data based on the motion estimate and wherein the motion estimate comprises an adapted system matrix.

24. A method of processing data for medical imaging, the method comprising:
providing a set of first modality data including a plurality of views;
providing a set of second modality data;
generating a motion estimate for each of the plurality of views in the set of first modality data by registering the set of first modality data with the set of second modality data, wherein the motion estimate is generated by a patient motion assessment tool; and
generating a motion corrected model of the set of first modality data by forwarding projecting the set of first modality data including the motion estimate.

25. The method of claim 24, wherein the patient motion assessment tool generates a motion estimation in a projection space.

26. The method of claim 24, wherein the patient motion assessment tool generates a motion estimation in an image space.

27. A method of processing data for medical imaging, the method comprising:
providing a set of first modality data including a plurality of views;
providing a set of second modality data;
generating a motion estimate for each of the plurality of views in the set of first modality data by registering the set of first modality data with the set of second modality data; and
generating a motion corrected model of the set of first modality data by forwarding projecting the set of first modality data including the motion estimate; and
performing a point spread function convolution of the motion-corrected model to identify a depth dependent detector response.

28. A method of processing data for medical imaging, the method comprising:
providing a set of first modality data including a plurality of views;
providing a set of second modality data;
generating a motion estimate for each of the plurality of views in the set of first modality data by registering the set of first modality data with the set of second modality data; and
generating a motion corrected model of the set of first modality data by forwarding projecting the set of first modality data including the motion estimate, wherein the motion-corrected model is iteratively updated by comparing the first modality data to an nth iteration-motion corrected model to generate updated first modality data, wherein the nth iteration motion-corrected model is a motion-corrected model generated by an nth iteration of the method of processing data.

* * * * *

UNITED STATES PATENT AND TRADEMARK OFFICE
CERTIFICATE OF CORRECTION

PATENT NO. : 10,304,219 B2
APPLICATION NO. : 15/315313
DATED : May 28, 2019
INVENTOR(S) : Michal Cachovan and Alexander Hans Vija It is certified that error appears in the above-identified patent and that said Letters Patent is hereby corrected as shown below:

In the Specification

Column 5, Lines 40-41, should read:
"the set of first modality data is obtained through a SPECT scan of a patient..."

Column 7, Lines 63-64, should read:
"The patient motion assessment tool 260 can generate the patient motion estimate..."

In the Claims

Column 10, Line 23, Claim 5 should read:
"The method of claim 4, wherein the motion corrected model...."

Column 11, Line 22, Claim 16 should read:
"The non-transitory, computer readable medium of claim 15, wherein the motion corrected model..."

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*